United States Patent [19]

Taig

[11] 4,446,998

[45] May 8, 1984

[54] SUPPORT ASSEMBLY FOR A VEHICLE

[76] Inventor: Alistair G. Taig, 19032 Summers Dr., South Bend, Ind. 46637

[21] Appl. No.: 327,749

[22] Filed: Dec. 7, 1981

[51] Int. Cl.³ .............................................. B60R 9/04
[52] U.S. Cl. .................................... 224/329; 414/462; 248/201; 224/310
[58] Field of Search ................ 414/462; 224/309, 310, 224/314, 315, 316, 318–325, 327, 329, 331; 248/201

[56] References Cited

U.S. PATENT DOCUMENTS

| | | | |
|---|---|---|---|
| 3,339,813 | 9/1967 | Barenyi | 224/329 X |
| 3,731,967 | 5/1973 | Hughes | 224/321 X |
| 4,236,860 | 12/1980 | Gottlieb et al. | 414/462 |
| 4,354,625 | 10/1982 | Peoples | 224/325 X |
| 4,364,500 | 12/1982 | Bott | 224/325 |

Primary Examiner—Robert J. Spar
Assistant Examiner—Ken Muncy

[57] ABSTRACT

A support assembly for a vehicle includes a pair of strips extending from front to rear. Each strip forms a pair of V shaped ends which are twisted so that the load carried by the support assembly is spread over each strip and an outer surface for the vehicle.

3 Claims, 6 Drawing Figures

SUPPORT ASSEMBLY FOR A VEHICLE

This invention relates to a support assembly for a vehicle and, in particular, a support assembly which is attached to the roof of a vehicle and adapted for carrying cargo such as a boat.

The prior art is illustrated in U.S. Pat. Nos. 2,551,351; 3,186,569; 3,460,694; 4,003,485; 3,193,124; and 3,452,893. In the prior art a support assembly is attached to the vehicle roof and a boat carrier is adapted for mounting on the support assembly while a boat is attached to the boat carrier. Consequently, the boat is first attached to the boat carrier and then the boat carrier is maneuvered to rest on top of the support assembly.

If the weight of the boat is too heavy or the roof of the vehicle is too thin, it is possible for the weight of the boat to dent the vehicle roof. Since vehicles are being manufactured with thinner roof panels to save weight and increase vehicle efficiency, it is important that the support assembly accomodate the thin roof panels to substantially prevent damage to the roof panels when the boat and boat carrier are mounted on top of the support assembly.

The present invention provides a solution to the above problem. In particular, the support assembly upon which the boat carrier and boat are mounted is provided with a pair of strips which are engageable with the vehicle roof. Each strip extends substantially horizontally from front to rear on the vehicle. Each end of each strip is bent to form a V with a leg thereof attached to a cross bar, there being a pair of cross bars connected to the pair of strips. The cross bars engage the boat carrier to transfer the weight of the boat to the pair of strips. The leg of each V is twisted to impart a predetermined angularity to that portion of the strip engaging the vehicle roof line. The combination of tension in each strip, bending movement applied to the end of the strip, and roof curvature serve to spread the load along the strip. The load distribution may be further improved by stiffening the center portion of the strip by bending flanges along the center portion or by stiffening the ends of the strip. When the boat is loaded on top of the cross bars, the legs of the V are loaded horizontally and vertically, so that the horizontal loading is imparted to that portion of the strip engaging the vehicle roof in order to spread the weight of the vehicle over the vehicle roof.

It is an object of the invention to provide a vehicle support assembly which spreads the weight of cargo carried by the support assembly over the vehicle roof.

One way of carrying out the invention is illustrated in the accompanying drawings wherein.

Figure 1:
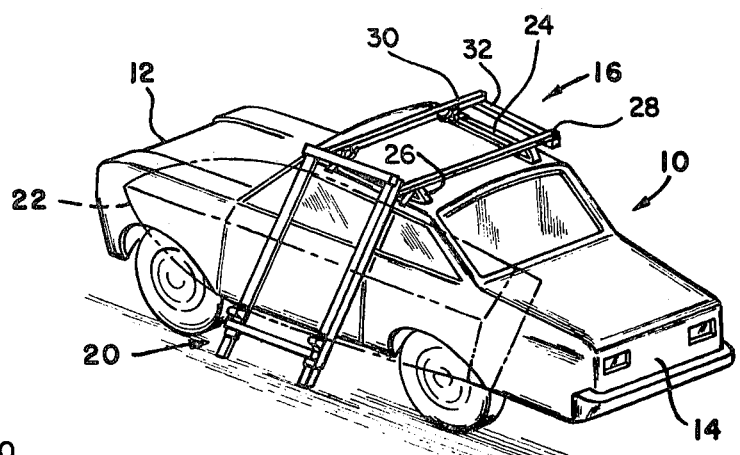
FIG. 1 is a perspective view of a vehicle including the support assembly of the present invention.

In FIG. 1, a vehicle 10 includes a front end 12 and a rear end 14. A support assembly 16 constructed in accordance with the present invention is disposed on the vehicle roof 18. A boat carrier assembly 20 is pivotally engaged with the support assembly 16 so that a boat illustrated in phantom at 22 is carried off the ground along the side of the vehicle. In order to mount the boat on the vehicle, the boat carrier is simultaneously pivoted upward about the support assembly and moved over the support assembly.

The carrier assembly 20 is used merely to dispose the boat 22 or similar object on top of the support assembly 16. The part of the carrier assembly 20 nearest the ground in FIG. 1 is lifted to pivot the carrier assembly 20 about the support assembly 16 while at the same time the carrier assembly 20 is pushed toward the vehicle 10 to overlay the support assembly 16. Once the carrier 20 and boat 22 are disposed on top of the support assembly, suitable means, such as ropes, are used to tie the boat 22 and carrier assembly 20 to the vehicle and/or the support assembly 16. This method for disposing the boat 22 and carrier assembly 20 on top of the support assembly 16 is believed to be well known in the prior art, see U.S. Pat. No. 4,236,860 for a similar method, and, as such, is not a part of the invention herein. Moreover, the carrier assembly 20 is not a part of the invention herein, so that any type of carrier assembly can be used to dispose an object on top of the support assembly.

Figure 2:
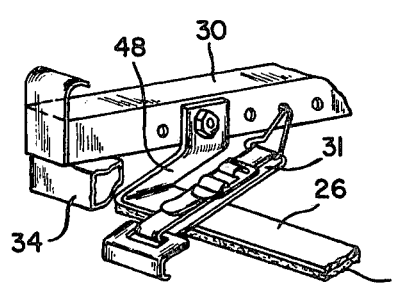
FIG. 2 is a view of the attachment means used to attach the support assembly to the vehicle roof.
Figure 3:
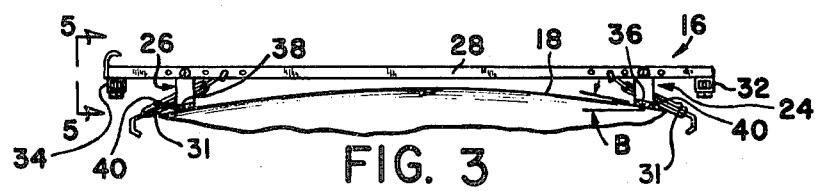
FIG. 3 is a side view of the support assembly.
Figure 4:
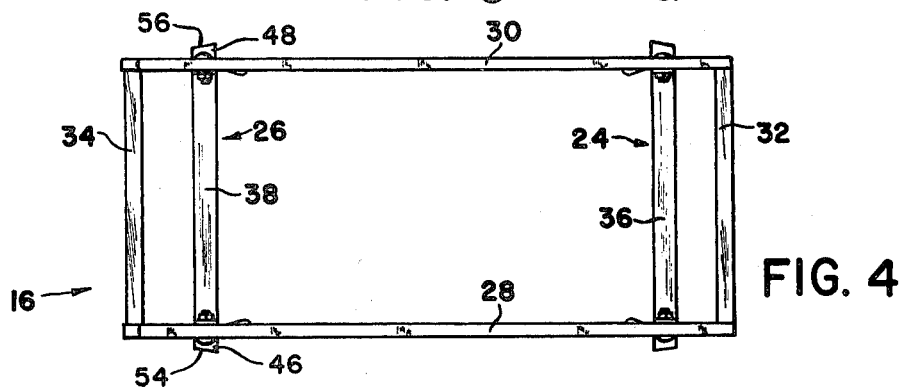
FIG. 4 is a top view of the support assembly.

The support assembly comprises a pair of strips 24 and 26, a pair of cross bars 28 and 30, and a pair of links 32 and 34. The pair of strips 24 and 26 and links 32 and 34. The pair of strips 24 and 26 and links 32 and 34 extend from front to rear while the pair of cross bars 28 and 30 extend from side to side. The pair of links 32 and 34 are connected at their ends with the ends of the pair of cross bars 28 and 30 to form a rectangle viewing FIG. 4. The attachment means shown in FIG. 2 comprises a conventional strap 31 extending from the cross bar 30 to attach the support assembly 16 to the vehicle roof. Four such straps are used—two being shown in FIG. 3.

Figure 5:
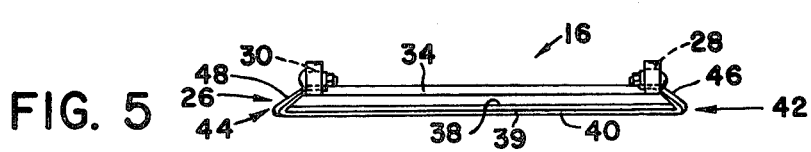
FIG. 5 is a side view of the support assembly.

Each strip 24 and 26 includes a substantial length portion 36 and 38, respectively, which is provided with a cushion 40 engaging the vehicle roof 18. The strip 26 in FIG. 5 is bent at each end to form a front V 42 and a rear V 44. The top leg 46 of V 42 connects with the cross bar 28 and the top leg 48 of V 44 connects with the cross bar 30. In FIG. 5, it is seen that the length of the portion 38 is longer than the length of the link 34. Each leg 46 and 48 forms an angle with the portion 38 substantially equal to 45° and the legs extend from the portion 38 in a direction towards each other.

Figure 6:
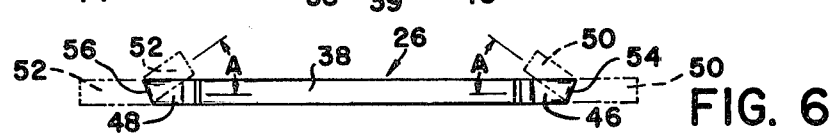
FIG. 6 is a view of a strip used to cnstruct the support assembly.

Turning to FIG. 6, the strip 26 is shown prior to deformation of its ends. The ends are shown in phantom at 50 and 52 prior to deformation in longitudinal alignment with the portion 38 and directed away from each other. Each end 50 and 52 is bent approximately 135° outwardly from the drawing in FIG. 6 and upwardly in FIG. 6 to form the angle A and also to define a tapered edge 54 and 56. After this step, the ends 50 and 52 also define an angle A in a lateral direction relative to the portion 38. Next, the ends 50 and 52 are bent laterally about the respective tapered edges 54 and 56 to align the ends 50 and 52 with the portion 38, viewing FIG. 6, thereby forming legs 46 and 48. When the ends are bent about the tapered edges, the legs 46 and 48 are twisted and the portion 38 is also twisted to define an angle B, see FIG. 3, relative to a horizontal axis. The angle B substantially matches the contour of the vehicle roof 18.

Returning to FIG. 5, when the boat and carrier are mounted atop the support assembly 16, the weight of the boat and carrier is transmitted through the legs 46 and 48 to the portion 38. The force transmitted through each leg includes a horizontal component which loads the portion 38 in tension to "stretch" the portion 38 and permit slight downward pivoting for the legs 46 and 48. As the legs 46 and 48 are pivoted slightly to dispose the link 34 closer to the portion 38, viewing FIG. 5, the link 34 prevents the legs 46 and 48 from approaching each other. Consequently, the slight pivoting of the legs 46 and 48, albeit minimal, "stretches" the portion 38 to load the latter in tension. With the portion 38 "stretched" the verticle forces are spread over the portion 38 to avoid concentrating the weight of the boat and carrier at one location of the vehicle roof.

In an alternative construction for each strip 24 and 26, a center portion 39, see FIG. 5, is provided with bending flanges (not shown) extending upwardly to stiffen each strip.

Although the foregoing description referred specifically to a boat carrier for use with the support assembly of the present invention, it is intended that any cargo suitable for carrying outside the vehicle can be used with the support assembly without departing from the present invention.

I claim:

1. A support assembly for a vehicle having a roof extending over the top of the vehicle, the support assembly including at least one strip being formed from a flat piece of material, said one strip being engageable with the roof and connecting means engageable with the one strip, the support assembly being coupled to the vehicle and cooperating with the connecting means for the purpose of carrying cargo outside of the vehicle above the roof, characterized by said one strip including a pair of end legs engageable with said connecting means to form an invariant spacing between said pair of end legs and an intermediate leg extending integrally from said pair of end legs, said intermediate leg contacting the roof over substantially its entire length, said pair of end legs being bent in a normal direction relative to said intermediate leg to substantially define a V with said intermediate leg to dispose said connecting means in spaced relation to the roof, said pair of end legs also being bent in a lateral direction relative to said intermediate leg to impart an angular orientation (B) to said intermediate leg such that said intermediate leg substantially matches a contour for the roof, said pair of end legs cooperating with said intermediate leg to transmit a portion of the cargo load thereto in a direction substantially normal to the roof while at the same time transmitting another portion of the cargo load thereto in a direction substantially parallel to the roof, and said pair of end legs are relatively flexible to slightly deflect under the weight of the cargo load and dispose said connecting means closer to the roof, the slight deflection of said pair of end legs stretching said intermediate leg to load the latter in tension so that the weight of the cargo load is substantially spread over the length of said intermediate leg.

2. The support assembly of claim 1 in which said one strip defines a leading edge disposed forwardly on the vehicle roof and said leading edge forms an angle with a transverse axis extending from side to side on the vehicle.

3. A support assembly for a vehicle comprising:
a pair of strips substantially horizontally extending from front to rear and engageable with an outer surface of the vehicle;
a pair of cross bars extending from side to side and connected to ends of said pair of strips, said pair of cross bars being capable of carrying cargo outside of the vehicle above the outer surface; and
a pair of links extending parallel to said pair of strips and connected to said pair of cross bars;
said pair of strips defining V shaped ends which are substantially flexible to permit said pair of cross bars to move slightly vertical relative to said pair of strips when the cargo is carried on said pair of cross bars;
said pair of links cooperating with said pair of cross bars to substantially maintain an invariant spacing therebetween; and
said pair of strips cooperating with said pair of cross bars and said pair of links when the cargo is carried on top of the pair of cross bars to slightly flex said V shaped ends in the direction of the outer surface and impart tension forces to that portion of said pair of strips engaging the outer surface in order to spread the load imparted by the cargo substantially over the length of that portion of said pair of strips engaging the outer surface, each of said pair of strips being formed from a flat piece of material having a longitudinal axis, the ends of said flat piece of material being bent partially outwardly in a normal direction and a lateral direction relative to the longitudinal axis to define edges angularly disposed relative to the longitudinal axis, and the ends are bent about the edges so that the ends of said flat piece of material extend outwardly in the vertical direction when said pair of strips are engaged with the outer surface and even though the outer surface is substantially arcuate from front to rear and from side to side.

* * * * *